United States Patent Office 3,092,452
Patented June 4, 1963

3,092,452
PRODUCTION OF LOW-SODA ALUMINA
Walter H. Gitzen, Belleville, Ill., assignor to Aluminum Company of America, Pittsburgh, Pa., a corporation of Pennsylvania
No Drawing. Filed Aug. 18, 1959, Ser. No. 834,387
4 Claims. (Cl. 23—143)

This invention relates to the production of alumina of low soda content, and more particularly relates to a method for the treatment of alumina hydrate containing a small amount of soda as an impurity to substantially reduce the soda content thereof.

In the conventional Bayer process for alumina production, alumina hydrate is precipitated from a solution of sodium aluminate. The precipitated alumina hydrate may be calcined or otherwise treated to obtain alumina which in turn has found wide application in the production of ceramics and refractory materials. However, an appreciable amount of caustic, usually referred to as soda ($Na_2O$), is occluded by the alumina during the precipitation step, and is not removed by subsequent leaching and/or calcining of the alumina at temperatures of about 1300° F. The soda impurity, which varies from about 0.2 to 1% by weight as $Na_2O$ in alumina, may be deleterious to many applications for alumina and especially reduces the electrical insulating qualities of alumina porcelains.

Considerable effort has been expended to determine a method for freeing the alumina from soda. One known commercial process proposes calcining of Bayer process alumina hydrate in the presence of boric oxide at a temperature of at least 1300° C. to volatilize the sodium borate produced by reaction of the boric oxide and sodium oxide. However, the alumina dust contaminated with sodium borate is picked up by the hot gases during calcination and carried out of the kiln. To avoid this loss of alumina values and to recover the alumina dust substantially free from sodium borate, the process has been further modified so that the dust is collected, as in a cyclone dust collector, and leached with water to dissolve out the sodium borate. The recovered alumina thus may be returned to the calcining kiln where it is mixed with the material being converted to alumina.

Although this process, as modified, has been generally satisfactory, it has been found that the volatilized sodium borate attacks the kiln lining, causing its disintegration and resultant contamination of the alumina. Further, the presence of volatilized sodium borate has been found to produce alumina of large and varying median crystal size, for example from about 6 to 10 microns.

It is therefore a general object of the invention to provide an improved method of producing alumina of low soda content.

It is a more specific object of the invention to provide a method for the treatment of alumina hydrate containing a small amount of soda as an impurity whereby alumina of low soda content may be prepared, the alumina being characterized by small median crysal size.

It is still another object to provide a method of producing alumina of low soda content which eliminates from the process the adverse effects of volatilized sodium borate.

It has now been found that the above objects, and others which will become evident from the description herein, can be attained by a method in which the alumina hydrate, containing a small amount of soda as an impurity, is admixed with boric oxide, the admixture is heated at a temperature sufficient to solubilize the sodium oxide, but below the effective volatilization temperature of sodium borate, and then leached to dissolve out the solubilized sodium oxide. By this treatment, alumina can be produced which contains less than about 0.08% soda and usually less than about 0.05% soda. The boric oxide may be added as boric oxide per se or as boric acid, but is preferably added as a boric acid solution so as to guarantee adequate mixing. The amount employed should ordinarily provide at least an 0.9:1 molar ratio of boric oxide to sodium oxide, and it is preferred to use a molar ratio of about 1–2:1. Quantities providing a ratio below about 0.9:1 usually afford insufficient solubilizing of the soda content while quantities providing above 4:1 result in excessive amounts of boric oxide in the leached product for most purposes.

The duration of the heating step will vary with the temperature, i.e., higher temperatures require shorter periods of heating to achieve the desired solubilizing or conversion effect on the soda content. Generally, the effect is quite slow at 1100° C., requiring more than about two hours to effect the conversion to sodium borate with a molar ratio as high as 4:1 of boric oxide to sodium oxide. At 1150° C. the effect is considerably more rapid although still relatively slow and requiring times of more than about 1 hour with the 4:1 molar ratio. However, at 1200° C., the solubilizing effect is most desirably carried out, the time required being on the order of about ½ hour to achieve the desired solubilization of the soda and this is true for the various molar ratios of boric oxide to sodium oxide described herein.

Volatilization of the sodium borate is insignificant until temperatures of 1275° C. and above are reached, 1300° C. being considered the effective volatilization temperature. There is some tendency for the boric oxide to volatilize at the higher temperatures but this may be disregarded within the operative temperature range of this invention. Premature volatilization of the boric oxide and sodium borate is minimized by intimate mixing of the boric oxide and alumina hydrate and further ensures adequate contact between the reactants. Partial precalcination of the alumina prior to the addition of the boric oxide also favors intimate mixing of the reactants.

The leaching medium may be any which will dissolve the sodium borate and excess boric oxide from the calcined product. From the standpoint of cost and ease of handling, water is considered to be most desirable, although other solvents might be employed if there is no contaminating effect. The water employed is desirably free from various contaminating salts and may be deionized, distilled, or otherwise suitably treated. Because the alumina hydrate has been converted substantially to α-alumina by the elevated temperatures of the process, the hydrating effect of the water is minimal and may be disregarded.

Exemplary of the present invention are the data contained in the table. Samples of Bayer process alumina hydrate containing about 0.4 percent by weight of sodium oxide were admixed with boric acid to provide the molar ratio of boric oxide indicated. The admixture was heated to solubilize the soda and leached with boiling water, decanted, and again leached with water and decanted. Distilled water was employed in these tests.

Table 1

| Molar Ratio $B_2O_3/Na_2O$ | Calcining Conditions | | Analysis of Calcined Alumina After Water Leaching | | |
|---|---|---|---|---|---|
| | Time, Hrs. | Temp., °C. | $Na_2O$, percent by wt. | $B_2O_3$, percent by wt. | Median crystal size, microns |
| Control (No $B_2O_3$) | 1.0 | 1,150 | 0.26 | 0.00 | |
| | 1.0 | 1,300 | 0.30 | 0.00 | |
| 4:1 | 2.0 | 1,200 | 0.01 | 0.98 | 3 |
| 2:1 | 2.0 | 1,120 | 0.08 | 0.03 | 2 |
| | 1.0 | 1,175 | 0.02 | 0.02 | 2 |
| | 0.5 | 1,200 | 0.02 | 0.02 | 3 |
| 1.25:1 | 1.0 | 1,175 | 0.04 | 0.06 | 2 |
| | 0.5 | 1,200 | 0.03 | 0.06 | 2 |
| 1.13:1 | 1.5 | 1,175 | 0.05 | 0.04 | 1 |
| 1.0:1 | 1.0 | 1,200 | 0.05 | 0.04 | 1 |

The process yields a product of consistently high purity and small median crystal size. The lower temperatures and abbreviated heating periods required in this invention result in a considerable fuel saving over those heretofore employed. Additionally, the process eliminates the requirement of dust-collector washing and affords the potentiality of recovering the boron values in a reusable form as well as substantially eliminating the highly corrosive effect of volatilized sodium borate on the kiln linings.

Although the alumina hydrate for the present process, in general, is the hydrous precipitate obtained by the Bayer process as described above, it should be understood that the process is equally applicable to, and is intended to include, aluminum oxide or hydrates thereof, including those compounds which decompose during heating to yield alumina or alumina hydrate, such as the carbonated aluminas. Hydrated aluminum oxide, or alumina hydrate, is intended to embrace not only those compounds where water is present in definite proportions, such as the monohydrate or trihydrate form, but also the gelatinous form where the water is not present in a definite ratio.

Having thus described, my invention, I claim:

1. A method of removing soda from an aluminum compound containing soda and selected from the group consisting of alumina and alumina hydrate, comprising admixing with said compound boric oxide, heating said admixture at a temperature above 1100° C. but below the effective volatilization temperature of sodium borate to solubilize the sodium oxide contained in said aluminum compound, and subsequently leaching the heated admixture with a solvent for sodium borate.

2. A method of removing soda from an aluminum compound containing soda and selected from the group consisting of alumina and alumina hydrate, comprising admixing with said compound an amount of boric oxide sufficient to provide at least 0.9 mole per mole of sodium oxide contained in said aluminum compound, heating said admixture at a temperature above 1100° C. but below the effective volatilization temperature of sodium borate to solubilize the sodium oxide contained in said aluminum compound, and subsequently leaching the heated admixture with a solvent for sodium borate.

3. The method according to claim 2 wherein the said admixture is heated at a temperature of from about 1100 to 1200° C.

4. The method according to claim 2 wherein the molar ratio of boric oxide to sodium oxide is about 1–2:1.

References Cited in the file of this patent

UNITED STATES PATENTS

| | | |
|---|---|---|
| 1,950,883 | Gitzen | Mar. 13, 1934 |
| 2,069,060 | Fessler | Jan. 26, 1937 |
| 2,411,806 | Riesmeyer | Nov. 26, 1946 |
| 2,411,807 | Riesmeyer | Nov. 26, 1946 |
| 2,469,088 | Thompson | May 3, 1949 |
| 2,769,688 | Milliken et al. | Nov. 6, 1956 |
| 2,774,744 | Barrett et al. | Dec. 18, 1956 |
| 2,961,297 | Fenerty | Nov. 22, 1960 |